United States Patent
Baris et al.

(10) Patent No.: US 9,271,507 B2
(45) Date of Patent: Mar. 1, 2016

(54) APPARATUS AND METHOD FOR MANUFACTURING A STRAND OF A PASTY MASS

(71) Applicant: VEMAG Maschinenbau GmbH, Verden/Aller (DE)

(72) Inventors: Halis Baris, Dorverden (DE); Stephan Janke, Kirchlinteln (DE); Christoph Thelen, Heidenau (DE)

(73) Assignee: VEMAG Maschinenbau GmbH, Verden/Aller (DE)

( * ) Notice: Subject to any disclaimer, the term of this patent is extended or adjusted under 35 U.S.C. 154(b) by 346 days.

(21) Appl. No.: 14/053,062

(22) Filed: Oct. 14, 2013

(65) Prior Publication Data

US 2014/0106653 A1 Apr. 17, 2014

(30) Foreign Application Priority Data

Oct. 15, 2012 (DE) .................... 20 2012 009 795 U (51) Int. Cl.
*A22C 11/00* (2006.01)
*A22C 11/02* (2006.01)
*B29C 47/00* (2006.01)
(Continued)

(52) U.S. Cl.
CPC ............. *A22C 11/02* (2013.01); *A22C 11/0209* (2013.01); *B29C 47/0016* (2013.01); *B29C 47/128* (2013.01); *A22C 2013/0023* (2013.01)

(58) Field of Classification Search
CPC .... A22C 11/00; A22C 11/02; A22C 11/0209; A22C 11/029; A22C 11/10; A22C 13/00
USPC .................. 452/30, 32, 35, 37, 38, 46–48
See application file for complete search history.

(56) References Cited

U.S. PATENT DOCUMENTS

| 5,853,770 A | 12/1998 | Guillemette |
| 7,591,717 B2 | 9/2009 | Bachtle et al. |
| 2003/0228837 A1* | 12/2003 | Reutter .............. A22C 13/0003 452/37 |

(Continued)

FOREIGN PATENT DOCUMENTS

| DE | 69814665 T2 | 11/2003 |
| EP | 1371293 A1 | 12/2003 |

(Continued)

OTHER PUBLICATIONS

European Patent Office, Search Report issued in European Application No. 13187633.6 dated Feb. 13, 2014.

(Continued)

*Primary Examiner* — Richard Price, Jr.
(74) *Attorney, Agent, or Firm* — Wood, Herron & Evans, LLP (57) ABSTRACT

Apparatus and methods for producing a string of a pasty material, such as sausagemeat. The apparatus includes an extrusion head that includes at least one conveyor conduit for the pasty material to be shaped into a string. The conveyor conduit has an inlet, an outlet, and a receiving chamber for a casing material to be applied to the string. The receiving chamber has an entry for the casing material and an exit for applying the casing material to the string surface. The receiving chamber is also adapted to impart to the casing material, when flowing through the receiving chamber, a movement having at least a rotatory movement component about at least a longitudinal axis of the receiving chamber.

18 Claims, 3 Drawing Sheets

(51) Int. Cl.
*B29C 47/12* (2006.01)
*A22C 13/00* (2006.01)

(56) References Cited

U.S. PATENT DOCUMENTS

| | | | |
|---|---|---|---|
| 2007/0026777 A1* | 2/2007 | Mueller | A22C 11/0209 452/32 |
| 2009/0023373 A1* | 1/2009 | Bachtle | A22C 11/0209 452/33 |
| 2014/0106653 A1* | 4/2014 | Baris | A22C 11/0209 452/32 |
| 2015/0208675 A1* | 7/2015 | Baechtle | A22C 11/0263 452/32 |

FOREIGN PATENT DOCUMENTS

| | | |
|---|---|---|
| EP | 2016830 A1 | 1/2009 |
| WO | 8900910 A1 | 2/1989 |
| WO | 9922600 A1 | 5/1999 |
| WO | 2011087359 A1 | 7/2011 |

OTHER PUBLICATIONS

German Patent Office, Office Action received in German Patent Application 20 2012 009 795.4 dated Oct. 15, 2013.

* cited by examiner

APPARATUS AND METHOD FOR MANUFACTURING A STRAND OF A PASTY MASS

The present invention relates to an apparatus and a process for producing a string of a pasty material like sausagemeat or the like.

The invention concerns in particular an apparatus comprising at least an extrusion head which has at least one conveyor conduit for the pasty material to be shaped into a string, wherein the conveyor conduit has an inlet and an outlet, and which has a receiving chamber for a casing material to be applied to the string, wherein the receiving chamber has an entry for the casing material and an exit for applying the casing material to the string surface.

Apparatuses and processes of the above-indicated general kind are usually employed to produce sausages whose outer casing is produced from collagen or alginate. The pasty material, in particular the sausagemeat, is generally kept in readiness in a filling hopper of a sausage production machine and is processed by way of an extrusion head to provide a preferably continuous sausagemeat string. To impart a suitable strength to the sausagemeat string and thus to prevent unwanted breakage of the string and/or the sausage ultimately produced therefrom a casing material is applied to the string surface such as for example collagen or alginate. Collagen and alginate are casing materials which are capable of flow and which after application to the string surface, already set after a short period of time and produce a firm casing on the sausagemeat string.

Known apparatuses have at least one extrusion head having at least one conveyor conduit for the pasty material to be shaped into a string. The conveyor conduit has an inlet for the still unshaped pasty material and an outlet for the material which is shaped there to give a string. Frequently there is provided along a portion of the conveyor conduit, a receiving chamber which surrounds the conveyor conduit portion and in which the casing material is introduced before being applied to the string surface. For that purpose the receiving chamber has an entry for the casing material to pass into the chamber and an exit for applying the casing material to the string surface. In that case the outlet is usually provided along the entire periphery of the string which is frequently of an approximately cylindrical cross-section so that the entire periphery of the string can be covered with the casing material.

EP 1 371 293 B1 or WO 99/22600 A disclose apparatuses for producing a string from a pasty material having a respective extrusion head, downstream of which there is provided a receiving chamber surrounding the conveyor conduit and having an outlet in the form of an annular gap. The receiving chamber has an entry which is radially connected to the outside wall of the receiving chamber and by way of which the casing material like for example collagen is introduced into the receiving chamber. When the casing material is applied to the string surface there is the fundamental requirement to produce a casing of uniform thickness or gauge on the surface of the string of material. Pressure fluctuations can possibly occur on the known apparatuses within the receiving chamber whereby the casing material can suffer fluctuations in thickness, relative to the periphery of the string. Flaws in the casing material can possibly even occur on the surface of the string, which in the worst-case scenario can lead to the sausagemeat string tearing away. In addition the problems which arise can be worsened with the use of different casing materials which involve different viscosities and different flow properties deriving therefrom.

Therefore the object of the invention is to provide an apparatus and a process for producing a string of a pasty material, with which reliably more uniform coating of the string surface with the casing material is possible. In particular the invention seeks to provide that the apparatus and the process are suitable for being able to process casing material having different properties in the same advantageous fashion.

In an apparatus of the general kind set forth hereinbefore the object of the invention is attained in that the receiving chamber has means adapted to impart to the casing material when flowing through the receiving chamber a movement having at least a rotatory movement component about at least a longitudinal axis of the receiving chamber.

The invention is based on the realization that generating a movement of the casing material with at least a rotatory movement component around at least a longitudinal axis of the receiving chamber when flowing through the receiving chamber causes an advantageously uniform distribution of pressure over the entire exit from the receiving chamber. Possible pressure fluctuations at the outlet are thereby advantageously avoided, thereby ensuring continuous enclosure of the casing material on the string surface, with preferably a uniform layer thickness of the casing material. The string and also the sausages to be produced therefrom have on the one hand an advantageously uniform appearance while on the other hand unwanted breakage of the string at a portion which is not intended to be divided up, by virtue of inadequate covering of a string portion with the casing material, is advantageously avoided. Preferably the casing material on flowing through the receiving chamber performs a movement having a rotatory and a translatory axial movement component. That provides for implementing a movement of the casing material within the receiving chamber, that is predominantly in spiral form. The solution according to the invention makes it possible to also process casing materials of differing viscosities without any problem. The different flow properties thereof no longer have any influence worth mentioning on the pressure distribution in the receiving chamber.

In the present case the concepts "at least a rotatory movement component about at least a longitudinal axis of the receiving chamber" is preferably used to denote the generation of a (positively induced) flow of the casing material about the longitudinal axis of the receiving chamber with an angular extent of more than 180°. Preferably the casing material performs at least one complete rotary movement through 360° before it reaches the outlet of the receiving chamber and issues by way thereof. As a suitable means for generating such a rotatory movement component, it is possible to use a guide device for example within the receiving chamber, whereby the casing material on flowing through the receiving chamber is caused to be displaced with a movement having a preferential direction.

In accordance with a development of the invention it is advantageously provided that the entry is arranged at the outer chamber wall of the receiving chamber in such a way that its center line has a displacement relative to the longitudinal axis of the receiving chamber. Such an arrangement of the entry at the receiving chamber represents a preferred possible way of providing one of the means at the receiving chamber, with which a movement having a rotatory movement component can be imparted to the casing material on flowing through the receiving chamber. By virtue of the displaced, in particular asymmetric arrangement of the entry at the outer chamber wall of the receiving chamber, a positively induced movement of the casing material is implemented along for example the outer cylindrical wall of the receiving chamber. In that case the entry is arranged at the outer chamber wall in such a way that the casing material performs in particular a movement about the longitudinal axis of the receiving chamber, having an exclusively rotatory movement component, directly upon passing into the receiving chamber.

The displacement between the center line of the entry and the longitudinal axis of the receiving chamber preferably corresponds at least to half the free cross-section of the entry, thereby advantageously ensuring that the casing material when flowing through the receiving chamber moves with the movement according to the invention. In addition, the displacement by at least half of the free cross-section of the entry avoids an unwanted through-flow movement of the casing material in opposite relationship to the intended preferential direction within the receiving chamber. The reference to a displacement between the center line of the entry and the longitudinal axis of the receiving chamber denotes on the one hand an exclusively lateral displacement of the entry transversely relative to the longitudinal axis of the receiving chamber. On the other hand a displacement also means an angled or inclined arrangement of an entry which in itself is straight, through a predetermined angular amount, at the outer chamber wall of the receiving chamber.

As an alternative to a displacement between the center line of the entry and the longitudinal axis of the receiving chamber, in accordance with a development of the invention, it is provided that arranged in the entry region of the receiving chamber is at least one deflection element for producing the partially rotatory movement of the casing material which flows or passes into the receiving chamber. It is also possible by means of such deflection elements to achieve an advantageously targetedly directed deflection in the flow of the casing material flowing into the receiving chamber. The use of deflection elements in the entry region can be advantageous specifically when the entry, because of technical demands, cannot be arranged asymmetrically at the outer chamber wall of the receiving chamber.

For that purpose the deflection element can be arranged for example in an end region within the entry or at least partially projecting into the receiving chamber at the entry. A deflection element which is arranged in that way according to the invention already makes it possible to provide for specifically targeted guidance of the casing material to be introduced into the receiving chamber, within the entry. Incorrect guidance of the casing material introduced into the receiving chamber can thus be relatively easily avoided. For example the entry is subdivided into a plurality of guide passages for the casing material, with the at least one deflection element. The deflection elements used can be arranged for example only in the region of the entry or also only in the receiving chamber.

The deflection element used in particular in the entry region of the receiving chamber can be in the form in particular of a guide vane having a concavely curved guide surface. The use of a guide vane as the deflection element provides a structurally simple possible way of deflecting the casing material within the receiving chamber of the apparatus of the invention. By means of the guide vane which in the direction in which it extends can have a guide surface which is curved uniformly or also non-uniformly, it is advantageously always possible to impart to the casing material flowing into the receiving chamber by way of the entry, a movement involving at least a rotatory movement component about the longitudinal axis of the receiving chamber or along a chamber wall of the receiving chamber, that surrounds the string of pasty material.

An entry equipped with a deflection element is in particular a connecting portion extending substantially radially relative to the longitudinal axis of the receiving chamber. It is possible to implement a relatively simple supply with the casing material by way of an entry which is in the form of a connecting portion and whose center line is oriented over at least a predetermined portion radially relative to the longitudinal axis of the receiving chamber. For that purpose the connecting portion and therewith the receiving chamber of the extrusion head according to the invention are adapted to be connected or coupled in media-guiding relationship to a supply conduit for carrying the casing material. The media-guiding connection between the connecting portion and the supply conduit can be made for example by means of a screw connection or a push-rotation connection. It will be appreciated that the entry which with its center line involves a displacement relative to the longitudinal axis of the receiving chamber, as the connecting portion, for a media-guiding connection, can also be provided with a supply conduit conveying the casing material.

Preferably the entry which extends with its center line substantially radially relative to the longitudinal axis of the receiving chamber has in its entry region of the receiving chamber, a portion which is angled or curved through a predetermined angular extent, wherein the central axis of the curved or angled portion is oriented approximately transversely relative to the longitudinal axis of the receiving chamber. Instead of the deflection element being in the form of guide portions which are to be additionally arranged in the entry region, the deflection element is thus a portion or a part of the entry itself, thereby implementing a structurally simple configuration. Such a portion which is in particular curved or bent or which can also be straight has in respect of its central axis in the transitional region to the receiving chamber, an angular displacement of between about 10° and 60° relative to the center line of the entry portion which extends substantially radially relative to the receiving chamber.

In accordance with a further advantageous embodiment the entry is formed by means of a tube portion, wherein the ratio between the outside diameter of the receiving chamber and the diameter of the tube portion is about 2:1. The selected ratio of the diameters relative to each other guarantees an advantageous in-flow characteristic in respect of the casing material into the receiving chamber. The casing material flowing into the receiving chamber therefore always involves its direction of movement which is preferred according to the invention so that almost the entire mass of the casing material which is in the receiving chamber is moved with a rotary movement in the same direction in a spiral form around the longitudinal axis of the receiving chamber. Preferably the tubular portion which involves a displacement relative to the longitudinal axis and also the tubular portion provided with a deflection element are arranged on the outer chamber wall in such a way that the free discharge flow cross-sections thereof, with respect to a plane which extends transversely relative to the discharge flow direction and which at the same time passes through the longitudinal axis, lie in the plane formed between the longitudinal axis and the outer chamber wall.

The receiving chamber receiving the casing material is in particular in the form of an annular space, wherein the entry is arranged at the outer chamber wall thereof while the exit for the casing material is arranged at one of the lateral chamber walls which are in the form of a circular ring. The design configuration for the receiving chamber in the form of an annular space provides an advantageous structural possible way of being able to cover a shaped string of pasty material like for example sausagemeat simultaneously over the entire surface of the string with the casing material. For that purpose the exit of the receiving chamber is arranged in particular at a lateral chamber wall in the region near the inner wall of the annular space. That can provide for advantageously direct application to the string surface. The entry of the receiving chamber is provided at the outer peripheral surface or chamber wall of the annular space in such a way that, when the casing material flows into the annular space, a movement involving a predominantly rotatory movement component is firstly generated. The casing material which moves on a kind of circular path about the longitudinal axis then acquires an axial movement component, in addition to the rotatory movement component. Accordingly, over at least a portion in the longitudinal direction of the receiving chamber, the casing material performs a spiral movement about the longitudinal axis thereof and in particular about the inner chamber wall of the receiving chamber.

In a preferred embodiment of the apparatus according to the invention, the receiving chamber extends along at least a portion of the conveyor conduit, wherein at least the inner chamber wall of the receiving chamber is afforded by means of the conveyor conduit portion. Besides the tubular wall for the positive guidance of the pasty material to be shaped into a string, the inner chamber wall of the receiving chamber is also formed by way of the conveyor conduit, in particular a conveyor conduit portion. That provides a structurally simplified configuration for the extrusion head which accordingly can be advantageously produced.

In addition the outer chamber wall is provided by means of a tubular body which surrounds the conveyor conduit in concentric spaced relationship and at least one of the lateral chamber walls of the receiving chamber is provided by a radially inwardly extending wall portion arranged at the end on the tubular body. In addition the tubular body is adapted to be screwed to a conveyor conduit portion. Such in particular axis-symmetrical components can be produced by means of advantageous machining processes, like for example cutting machining production processes. The provision of a screw connection between the conveyor conduit and the tubular body forming at least the outer chamber wall represents an optimum possible way of being advantageously easily possible to connect components together. The conveyor conduit is provided in particular with a male thread and the tubular portion with a corresponding female thread. It is also possible to ensure an advantageous media-tight connection between the conveyor conduit and the tubular body by way of a screw means. The tubular body is a cylindrical tubular portion and the wall portion is a cylindrical disk body with a centrally arranged aperture.

The exit of the receiving chamber is associated in particular with the conveyor conduit outlet, whereby the string issuing from the conveyor conduit can advantageously be covered immediately with the casing material issuing from the exit, consisting for example of collagen or alginate. Strength is additionally imparted to the string by the casing material which is applied directly after issuing from the conveyor conduit. Unintentional string breakage can thereby be advantageously avoided. The casing material is still gel-like or capable of flow, while it is being processed. The casing material acquires its firm consistency after application after a drying or hardening time which is possibly necessary.

Preferably the exit is an annular gap which extends in an axial direction between the end portion of the conveyor conduit and the wall portion of the tubular body, which wall portion is arranged at a spacing relative to the end portion and extends in the radial direction. The annular gap which involves a preferably uniform gap dimension along its periphery ensures relatively simple discharge or issue of the casing material from the receiving chamber. In that case the end portion of the conveyor conduit projects at least region-wise into the aperture in the wall portion. In that case the gap dimension depends in particular on the spacing between the end portion of the conveyor conduit and the degree of opening of the aperture in the wall portion. Instead of an annular gap which extends exclusively in the axial direction, it will be appreciated that it is also possible in accordance with the invention for the annular gap to also extend over a predetermined region in the radial direction. It is possible in that way to provide for a casing material feed which is directed on to the string surface. The wall portion arranged at the end of the tubular body can be provided for that purpose with a projection which in the context of its centrally arranged aperture, has a displacement which projects inwardly in peripheral relationship and which is at the same time axial.

The height of the annular space between the outer and inner chamber walls is so selected that advantageous deflection of the casing material passing into the receiving chamber into a predominantly rotatory or circular movement about the longitudinal axis of the receiving chamber is guaranteed and the casing material is distributed in preferably uniform fashion. In addition a uniform distribution of pressure over the entire annular space is afforded within the receiving chamber. That advantageously results in a uniform discharge of the casing material over the entire annular gap at an end of the receiving chamber.

Another development of the invention provides that the conveyor conduit has an entry portion which narrows in the direction of flow of the pasty material. For that purpose the conveyor conduit can be a compacting tube having a portion of a tube cross-section which decreases in the flow or movement direction of the pasty material. Disposed upstream and/or downstream of the changing entry cross-section the compacting tube has respective tube cross-sections which remain the same. Specifically the tube cross-section arranged after the entry portion serves for guiding the pasty material which is then shaped to provide a string.

A further aspect of the invention concerns a machine for producing sausages from a pasty material, in particular from sausagemeat, comprising a filling hopper for receiving the pasty material, a delivery pump for conveying the pasty material, an apparatus for producing a string of pasty material as set forth in one of claims 1 through 16, and preferably at least one dividing device for dividing the shaped string covered with a casing material into individual portions with the formation of a division location.

An improved sausage production process is ensured on a sausage producing machine equipped with a string production apparatus designed in accordance with the invention in that way, by virtue of the casing material feed according to the invention. The sausages produced have a casing of advantageously uniform thickness for encasing the meat material which substantially forms the sausage. Breakage of the string produced in production of the sausages is avoided by the advantageously uniformly applied casing material, whereby the proportion of production wastages is reduced to an advantageously slight amount. The string production apparatus according to the invention makes it possible to apply various different kinds of casing materials which of capable of flow, entirely independently of their respective viscosities, to the string surface produced. In general the casing material applied to the string surface is post-treated by means of a consolidation device which can be connected directly downstream of the string production apparatus. Accordingly the individual string portions are divided up only after consolidation of the casing material.

In a process according to the invention for the production of a string of a pasty material like sausagemeat or the like, in which the pasty material, in particular sausagemeat, is shaped into a string of predetermined length, and then the string is covered at least with a casing material, it is provided according to the invention that before being applied to the string surface when flowing through a receiving chamber for the casing material the casing material is displaced with a movement having at least one rotatory movement component about at least a longitudinal axis of the receiving chamber.

The generation of a preferential direction for the casing material as it moves through the receiving chamber at the extrusion head generates an advantageously uniform pressure within the entire receiving chamber, whereby the casing material can always issue uniformly by way of the outlet of the receiving chamber. That gives the advantage of a uniform layer thickness for the casing material on the string produced, so that regions involving an excessive casing material thickness or even regions which are covered with the casing material inadequately or not at all are avoided. The degree of process reliability can be markedly increased or improved with a process according to the invention of that kind. Thus a process for producing sausages can be implemented with a markedly reduced fault quota in the production procedure.

The invention is described in greater detail hereinafter by means of the preferred embodiment and with reference to the accompanying Figures in which.

Figure 1:
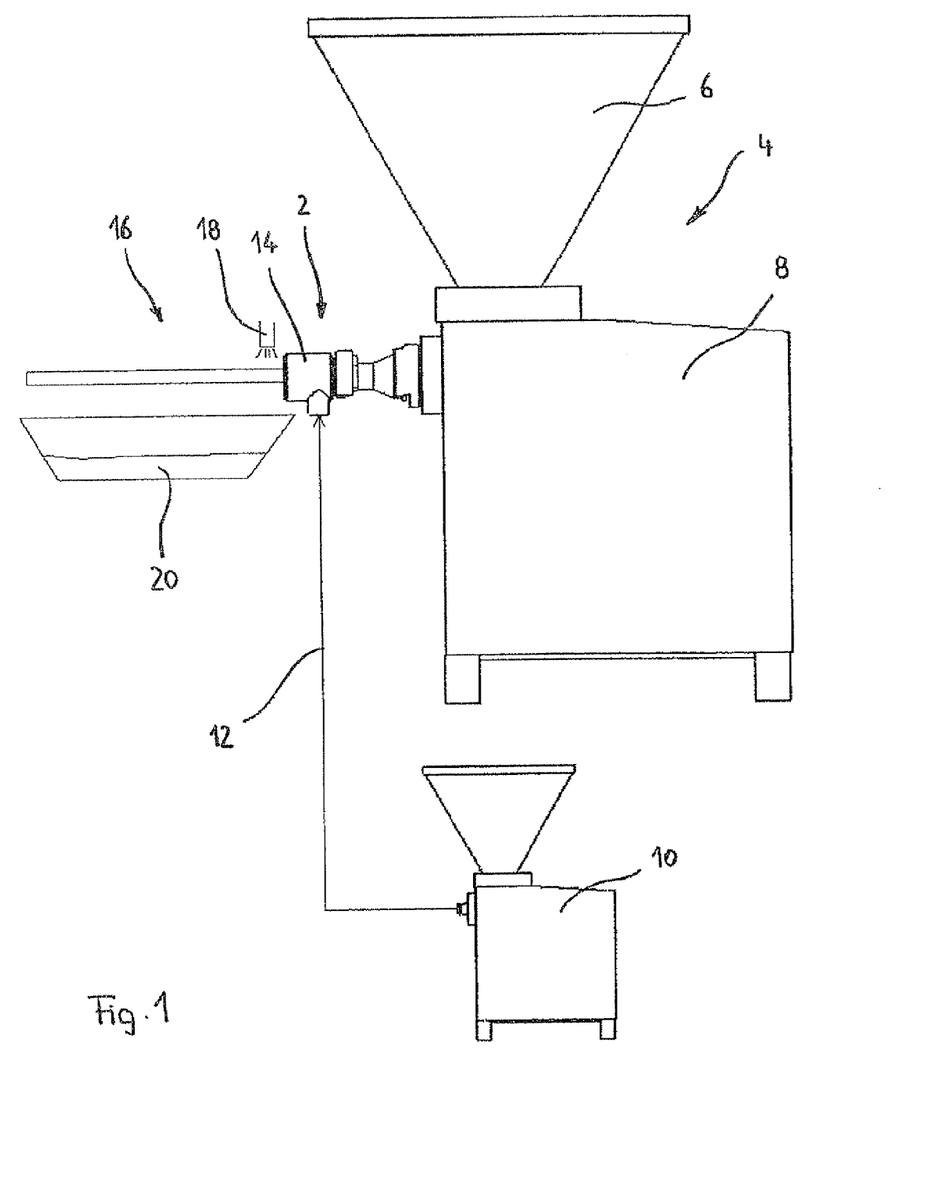
FIG. 1 shows a diagrammatic view of an apparatus for producing sausages.

Reference 2 denotes an apparatus for producing a string from a pasty material, which is part of a typical filling machine 4 for producing sausages. The machine 4 further includes a filling hopper 6 and a delivery pump (not shown in greater detail) arranged in a housing 8. The delivery pump can have for example a worm drive, by means of which the pasty material in the filling hopper 6 is transported in the direction of the apparatus 2 for producing the string.

A device 10, a machine which can be a typical filling machine, for producing or preparing casing material, in particular alginate or collagen, is connected to the apparatus 2 for string production by way of a supply conduit 12 in media-conducting relationship. The apparatus 2 has an extrusion head 14, within which the pasty material is shaped to provide an elongate string. At the same time the casing material produced in the device 10 is applied to the surface of the string by way of the extrusion head 14. Arranged downstream of the extrusion head 14 is at least one consolidation device 16, by means of which the casing material applied to the string surface is hardened in a reduced time. For that purpose the device 16 has a spray head 18, with which a solution is applied to the casing material. In addition a catch container 20 is part of the consolidation device, which catches again the solution which is superfluously applied. With the consolidated casing material a strength is imparted to the string, thereby avoiding unwanted string breakages. The machine 4 can further be equipped with a dividing device (not shown) and a transport device, with which a produced endless string is subdivided into portions of predetermined length and the individual portions are then transported portion-wise away.

Figure 2:
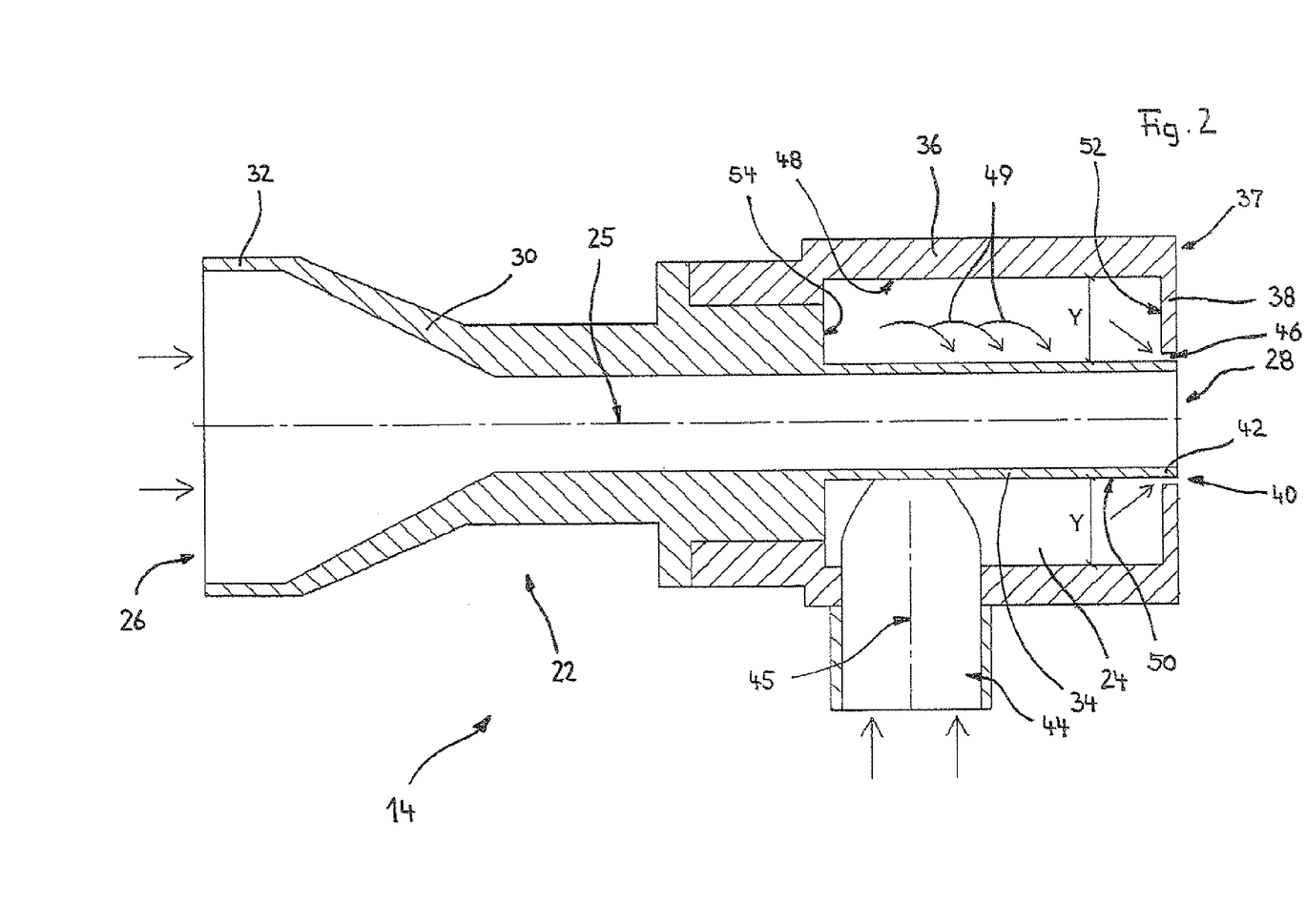
FIG. 2 shows a view of an apparatus according to the invention for producing a string of a pasty material in the form of a sectional view along line II-II in FIG. 3.
Figure 3:
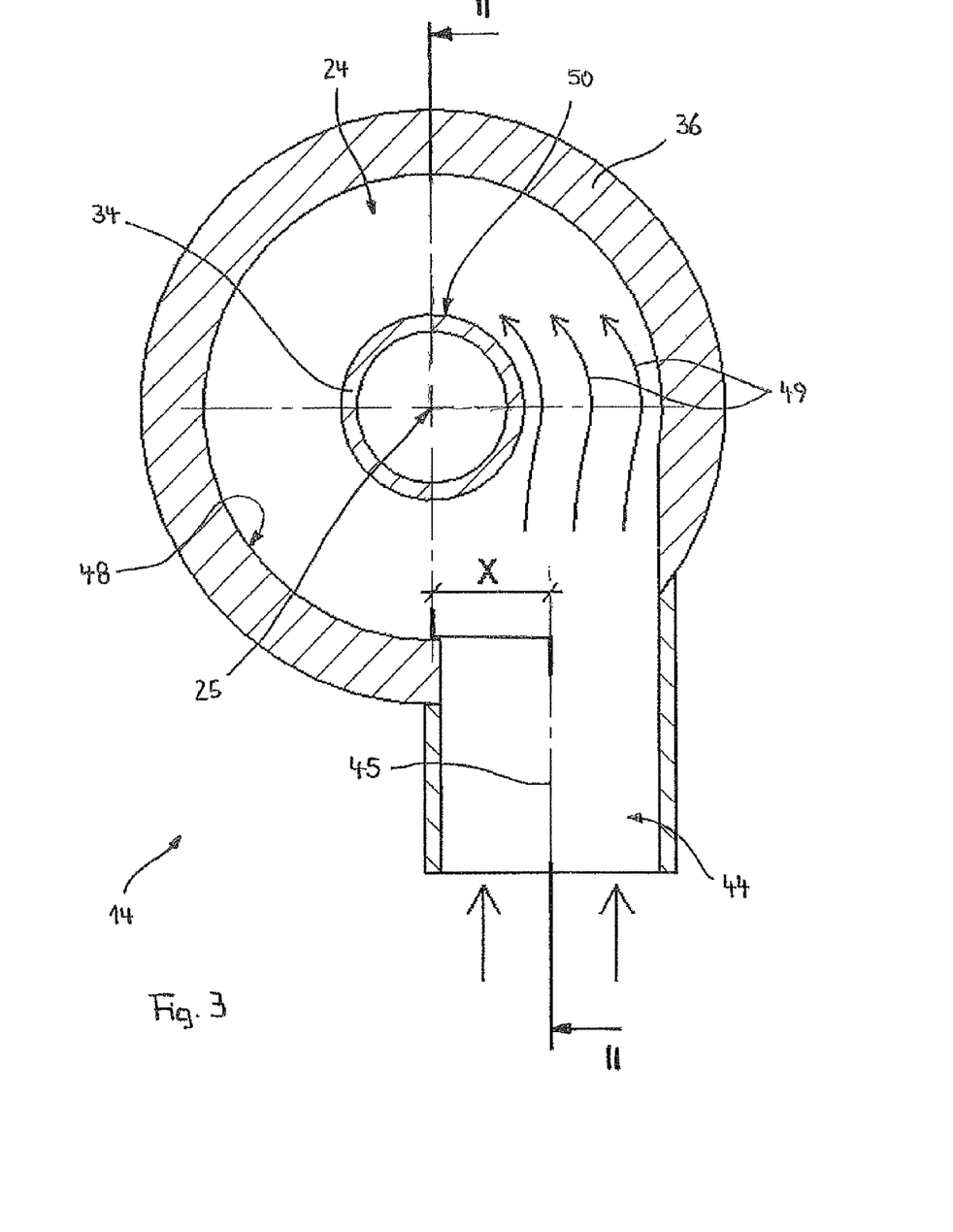
FIG. 3 shows a view of the apparatus according to invention as show in FIG. 2 transversely relative to the longitudinal axis.

FIGS. 2 and 3 show sectional views of the extrusion head 14 of the apparatus 2 according to the invention for string production, wherein the extrusion head 14 has at least one conveyor conduit 22 for the pasty material to be shaped into a string and a receiving chamber 24 for the casing material for encasing the shaped string. The conveyor conduit 22 has an inlet 26 and an outlet 28 for the pasty material for forming a string as well as an entry portion 30 which narrows in cross-section. Conduit portions 32, 34 of cross-sections which remain the same are respectively formed in one piece on the entry portion 30 upstream and downstream thereof. The conduit portion 34 is at least region-wise enclosed by a tubular body 36 arranged concentrically relative to the conveyor conduit 22. A radially inwardly extending wall portion 38 having an aperture 40 is arranged at the end 37 of the tubular body 36, that is associated with the outlet 28 of the conveyor conduit 22. In that arrangement the end portion 42 of the conveyor conduit 22 projects at least region-wise into the aperture 40.

The annular space between the conveyor conduit 22 and the tubular body 36 with its wall portion 38 serves as a receiving chamber 24 for the casing material, the receiving chamber having an entry 44 and an exit 46. The entry 44 is provided in particular at the outer chamber wall 48 formed by the tubular body 36, wherein, as shown in FIG. 3, the entry is arranged asymmetrically on the outer chamber wall. The center line 45 of the entry 44 which is preferably provided by a tubular portion involves a displacement X relative to the longitudinal axis 25 of the receiving chamber 24 and thus at the same time also relative to the conveyor conduit 22. In that way, the casing material conveyed to the extrusion head 14 by way of the supply conduit 12, upon passing into the receiving chamber 24 by way of the entry 44, has imparted thereto a movement having at least a rotatory movement component about at least the longitudinal axis 25 of the receiving chamber 24. Preferably the casing material, while flowing through the receiving chamber 24 from the entry 44 to the exit 46, performs within the receiving chamber 24 a movement of spiral shape (arrows 49) around the region of the conduit portion 34, which provides the inner chamber wall 50 of the receiving chamber 24.

The center line 45 of the entry 44 involves a displacement relative to the longitudinal axis 25 of the receiving chamber 24, that corresponds at least to half the free cross-section of the entry 44. The exit 46 is provided in one of the lateral chamber walls 52, 54 of the receiving chamber. The exit 46 is arranged in the chamber wall 52 associated with the outlet 28 of the conveyor conduit, and is in the form of an annular gap. The exit 46 is provided between the end portion 42 of the conveyor conduit 22 and the wall portion 38 which is arranged at a spacing relative thereto and which provides the chamber wall 52, and extends predominantly in the axial direction. Instead of an annular gap which extends exclusively in the axial direction the wall portion 38 arranged on the tubular body 36 at the end can have a projection (not shown) which extends radially inwardly and axially outwardly.

The invention claimed is:

1. An apparatus for producing a string of a pasty material, the apparatus comprising
   an extrusion head having a conveyor configured to shape the pasty material into a string, the conveyor including a conduit with an inlet, an outlet, and a receiving chamber for a casing material to be applied to the string, the receiving chamber having an entry for the casing material and an exit for applying the casing material to the string surface, and the receiving chamber configured to impart to the casing material, when flowing through the receiving chamber, a movement having at least a rotatory movement component about a longitudinal axis of the receiving chamber.

2. The apparatus of claim 1 wherein the entry is arranged at the outer chamber wall of the receiving chamber in such a way that a center line of the entry has a displacement (X) relative to the longitudinal axis of the receiving chamber.

3. The apparatus of claim 2 wherein the displacement (X) between the center line of the entry and the longitudinal axis of the receiving chamber corresponds at least to one-half of the free cross-section of the entry.

4. The apparatus of claim 1 further comprising:
at least one deflection element arranged at the entry of the receiving chamber, the at least one deflection element configured to produce the rotary movement of the casing material introduced into the receiving chamber.

5. The apparatus of claim 4 wherein the at least one deflection element is arranged in an end region within the entry or is arranged at least partially projecting into the receiving chamber at the entry.

6. The apparatus of claim 5 wherein the at least one deflection element is in the form of a guide vane having a concavely curved guide surface.

7. The apparatus of claim 5 wherein the entry is a connecting portion extending substantially radially relative to the longitudinal axis of the receiving chamber.

8. The apparatus of claim 5 wherein the entry region of the receiving chamber the entry includes a portion which is curved or angled through a predetermined annular amount, wherein the central axis of the curved or angled portion is oriented approximately transversely relative to the longitudinal axis of the receiving chamber.

9. The apparatus of claim 1 wherein the entry is defined by a tube portion, and the ratio between the outside diameter of the receiving chamber and the diameter of the tube portion is about 2:1.

10. The apparatus of claim 1 wherein the receiving chamber includes a plurality of lateral chamber walls and is in the shape of an annular space, the entry is provided at the outer chamber wall of the annular space, and the exit for the casing material is provided at one of the lateral chamber walls.

11. The apparatus of claim 10 wherein the lateral chamber walls are the form of a circular ring.

12. The apparatus of claim 1 wherein the receiving chamber includes an inner chamber wall and extends along at least one portion of the conduit of the conveyor, and the inner chamber wall of the receiving chamber is provided by a portion of the conduit of the conveyor.

13. The apparatus of claim 1 wherein the receiving chamber includes a plurality of lateral chamber walls and an outer chamber wall provided by a tubular body, the tubular body surrounds the conduit of the conveyor in concentric spaced relationship, and at least one of the lateral chamber walls of the receiving chamber is provided by a radially inwardly extending wall portion arranged at an end portion of the tubular body, and the tubular body is adapted to be screwed to a portion of the conduit of the conveyor.

14. The apparatus of claim 1 wherein the exit of the receiving chamber is associated with the outlet of the conduit of the conveyor.

15. The apparatus of claim 1 wherein the exit is an annular gap which extends in an axial direction between the end portion of the conveyor conduit and a wall portion of the tubular body, and the wall portion is arranged at a spacing relative to the end portion and extends in a radial direction.

16. The apparatus of claim 1 wherein the conduit of the conveyor has an entry portion that narrows in the direction of flow of the pasty material.

17. A machine for producing sausages from a pasty material, the machine comprising
a filling hopper for receiving the pasty material,
a delivery pump for conveying the pasty material,
an apparatus for producing a string of pasty material, the apparatus including an extrusion head having a conveyor configured to shape the pasty material into a string, the conveyor including a conduit with an inlet, an outlet, and a receiving chamber for a casing material to be applied to the string, the receiving chamber having an entry for the casing material and an exit for applying the casing material to the string surface, and the receiving chamber configured to impart to the casing material, when flowing through the receiving chamber, a movement having at least a rotatory movement component about a longitudinal axis of the receiving chamber, and
at least one dividing device for dividing the shaped string covered with a casing material into individual portions with the formation of a division location.

18. A method comprising:
shaping a pasty material into a string of predetermined length;
displacing a casing material with a movement having at least a rotatory movement component about at least a longitudinal axis of a receiving chamber; and
after the casing material is displaced, covering the string with the casing material.

* * * * *

UNITED STATES PATENT AND TRADEMARK OFFICE
CERTIFICATE OF CORRECTION

| | | |
|---|---|---|
| PATENT NO. | : 9,271,507 B2 | |
| APPLICATION NO. | : 14/053062 | |
| DATED | : March 1, 2016 | |
| INVENTOR(S) | : Halis Baris et al. | |

It is certified that error appears in the above-identified patent and that said Letters Patent is hereby corrected as shown below:

*In the Specification:*

At column 2, line number 39, "In the present case the concepts "at least a rotatory move-"" should read -- In the present case, the concept "at least a rotatory move- --

At column 6, line number 58, "different kinds of casing materials which of capable of flow," should read -- different kinds of casing materials which are capable of flow, --

*In the Claims:*

At column 9, claim number 8, line numbers 24-25, "The apparatus of claim 5 wherein the entry region of the receiving chamber the entry includes a portion which is" should read -- The apparatus of claim 5 wherein the entry includes a portion which is --

Signed and Sealed this
Twenty-first Day of June, 2016

Michelle K. Lee
*Director of the United States Patent and Trademark Office*